United States Patent
Tacklind et al.

(10) Patent No.: US 6,657,788 B2
(45) Date of Patent: Dec. 2, 2003

(54) METHODS AND APPARATUS FOR LASER DEVICE ADJUSTMENT

(75) Inventors: Christopher A. Tacklind, Palo Alto, CA (US); William F. Carlsen, Jr., Oakhurst, CA (US); Eugene F. Duval, Menlo Park, CA (US); Andrew G. Butler, Alto, CA (US); Thomas Zimmerman, Munich (DE)

(73) Assignee: Toolz, Ltd., Mongkok (HK)

(*) Notice: Subject to any disclaimer, the term of this patent is extended or adjusted under 35 U.S.C. 154(b) by 0 days.

(21) Appl. No.: 10/353,599

(22) Filed: Jan. 28, 2003

(65) Prior Publication Data

US 2003/0137741 A1 Jul. 24, 2003

Related U.S. Application Data

(62) Division of application No. 09/571,482, filed on May 16, 2000, now Pat. No. 6,542,304.
(60) Provisional application No. 60/159,524, filed on Oct. 15, 1999, and provisional application No. 60/134,403, filed on May 17, 1999.

(51) Int. Cl.[7] .................. G02B 27/10; G02B 27/14; G01B 11/26
(52) U.S. Cl. .................. 359/618; 359/629; 356/138
(58) Field of Search .................. 359/618, 619, 359/627, 628, 629, 633, 636, 641, 471, 482, 818, 822; 430/5; 356/138, 149

(56) References Cited

U.S. PATENT DOCUMENTS

| | | | | |
|---|---|---|---|---|
| 6,282,028 B1 | * | 8/2001 | Waibel et al. | 359/618 |
| 6,327,090 B1 | * | 12/2001 | Rando et al. | 359/618 |
| 6,525,884 B2 | * | 2/2003 | Kraiczek et al. | 359/629 |
| 6,542,304 B2 | * | 4/2003 | Tacklind et al. | 359/618 |
| 6,563,646 B1 | * | 5/2003 | Litvin | 359/618 |

* cited by examiner

*Primary Examiner*—Georgia Epps
*Assistant Examiner*—Jack Dinh
(74) *Attorney, Agent, or Firm*—Fenwick & West LLP

(57) ABSTRACT

A multi-beam tool is disclosed which can perform square, plumb, and level function which may be required in a construction environment. The tool can generate in a preferred embodiment up to five orthogonal beams with two beams being plumb and three beams being leveled. Combinations of two level beams, or a level and a plumb beam in orthogonal arrangement can produce a square alignment set of beams. The tool includes in a preferred arrangement a self-leveling pendulum to which a laser and quad-mirror arrangement is secured. The self-leveling pendulum is dampened in order to allow the tool to settle down and provide alignment after the tool is positioned as desired.

20 Claims, 14 Drawing Sheets

PENTA BEAM SPLITTER

BEAM AND DISK SPLITTER

METHODS AND APPARATUS FOR LASER DEVICE ADJUSTMENT

CROSS-REFERENCE TO RELATED APPLICATIONS

This application is divisional application Ser. No. 09/571,482, of U.S. Pat. No. 6,542,304 May 16, 2000, which claims the benefit of U.S. provisional application No. 60/134,403 filed May 17, 1999 entitled "Self-Leveling Penta Laser Beam Device," and of U.S. provisional application No. 60/159,524, filed Oct. 15, 1999, entitled "Self-Leveling Penta Laser Beam Device." All of these applications are incorporated herein by reference.

ADDITIONAL REFERENCES

Reference is made to U.S. Pat. No. 5,680,208, issued Oct. 21, 1997, entitled GRAVITY ORIENTED LASER SCANNER, which is incorporated herein by reference.

BACKGROUND OF THE INVENTION

In many instances it is desired to establish reference lines. This is particularly useful for construction, grading, and "do it yourself" activities. Traditional tools for these tasks include straight edges, rulers, protractors, squares, levels, and plumb bobs. More modern tools include laser alignment devices.

Laser alignment devices include simple pointers, pointers with a bubble vial, self-leveling pointers, multiple beam pointers, and devices that produce a sheet of light. It is highly desirable to have multiple beams that are mutually orthogonal. This is typically achieved by several partially silvered mirrors at 45 degrees to the laser beam. This method requires placing the mirrors in precise alignment and securing them with glue. Further, the mirrors should be extremely stable over time and temperature. More beams require more mirrors at added expense and complexity.

SUMMARY OF THE INVENTION

The present invention relates to improvements to this field rendering simpler, more stable and cost effective laser devices which can generate one or more laser beams for measuring, aligning, leveling and other purposes.

DETAILED DESCRIPTION OF THE PREFERRED EMBODIMENT

I. Penta Beam Splitter

Figure 1:
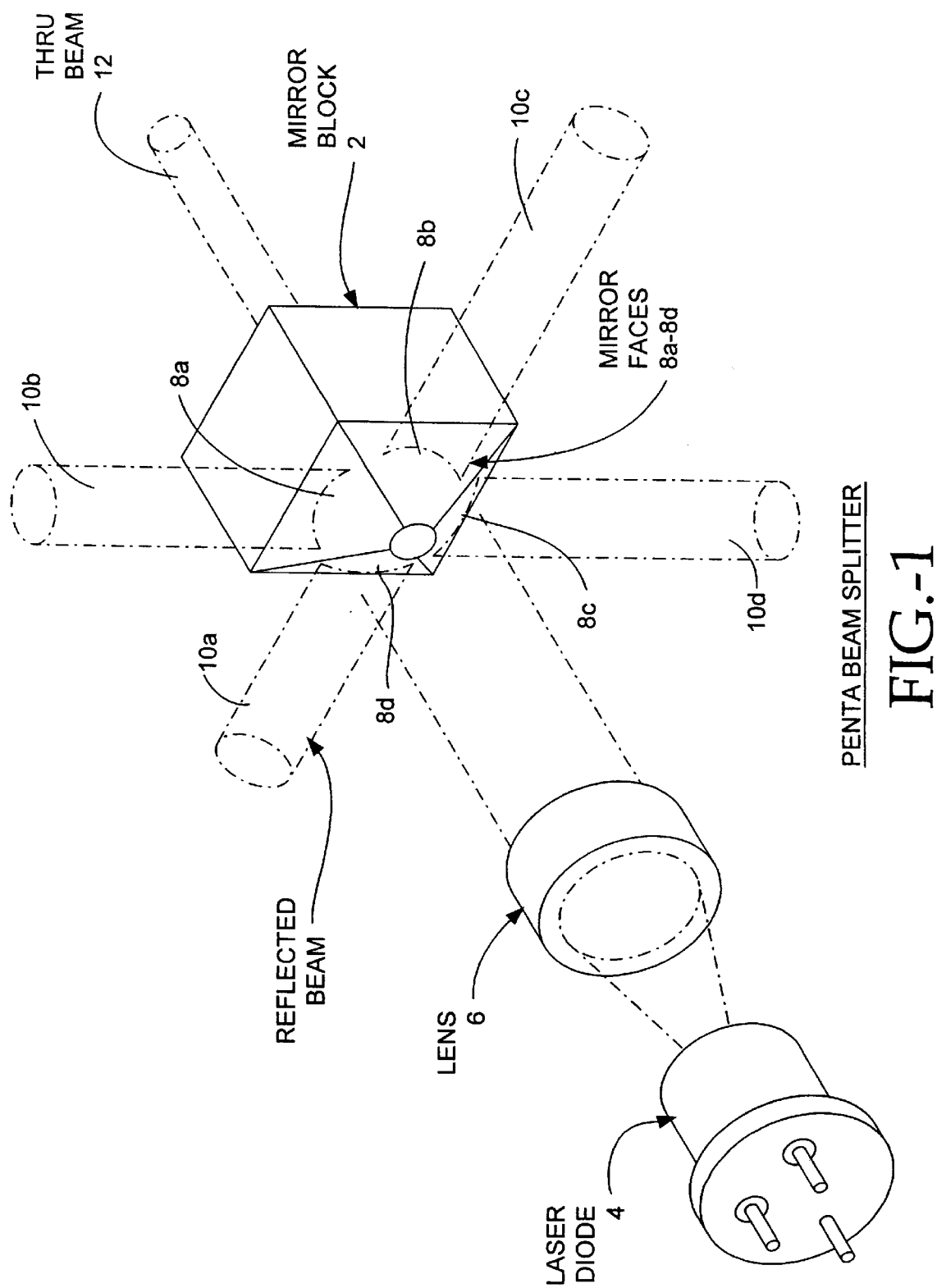
FIG. 1 is a perspective view of an embodiment of a penta beam splitter of the invention.

The present invention (FIG. 1) achieves the much-desired feature of producing a series of mutually orthogonal beams with a single splitter. Further, the beams are mutually coincident, that is, the beams all emanate from the same point.

The splitter in this embodiment is fabricated from a small block or cylinder of aluminum 2. Other materials and fabrication techniques can be otherwise employed. Four reflective mirror surfaces 8a–8d are produced by a process known as "single point diamond turning." This process is widely used to produce polygonal mirrors for laser printers. In one particular embodiment of the invention, four sections or portions 10a–10d of the collimated beam 9 are reflected from the mirror surfaces. A fifth portion of the light 12 passes directly through a hole 14 in the center of the block.

The angle of the mirrors must be precisely 45 degrees to the incident beam and have precise rotational symmetry. This is readily achieved by optical tooling fixtures.

In this embodiment, light from laser diode 4 is directed through a lens and collimator 6. This collimated light is directed at mirror block 2.

In another embodiment, a similar effect could be achieved by use of a refractive device that employs total internal reflection or refraction to produce a 90 degree bend. A small flat portion is created on the tip of the device closest to the incoming beam to allow part of the beam to pass through undeflected, producing a fifth beam.

II. Beam and Disk Splitter

Figure 2:
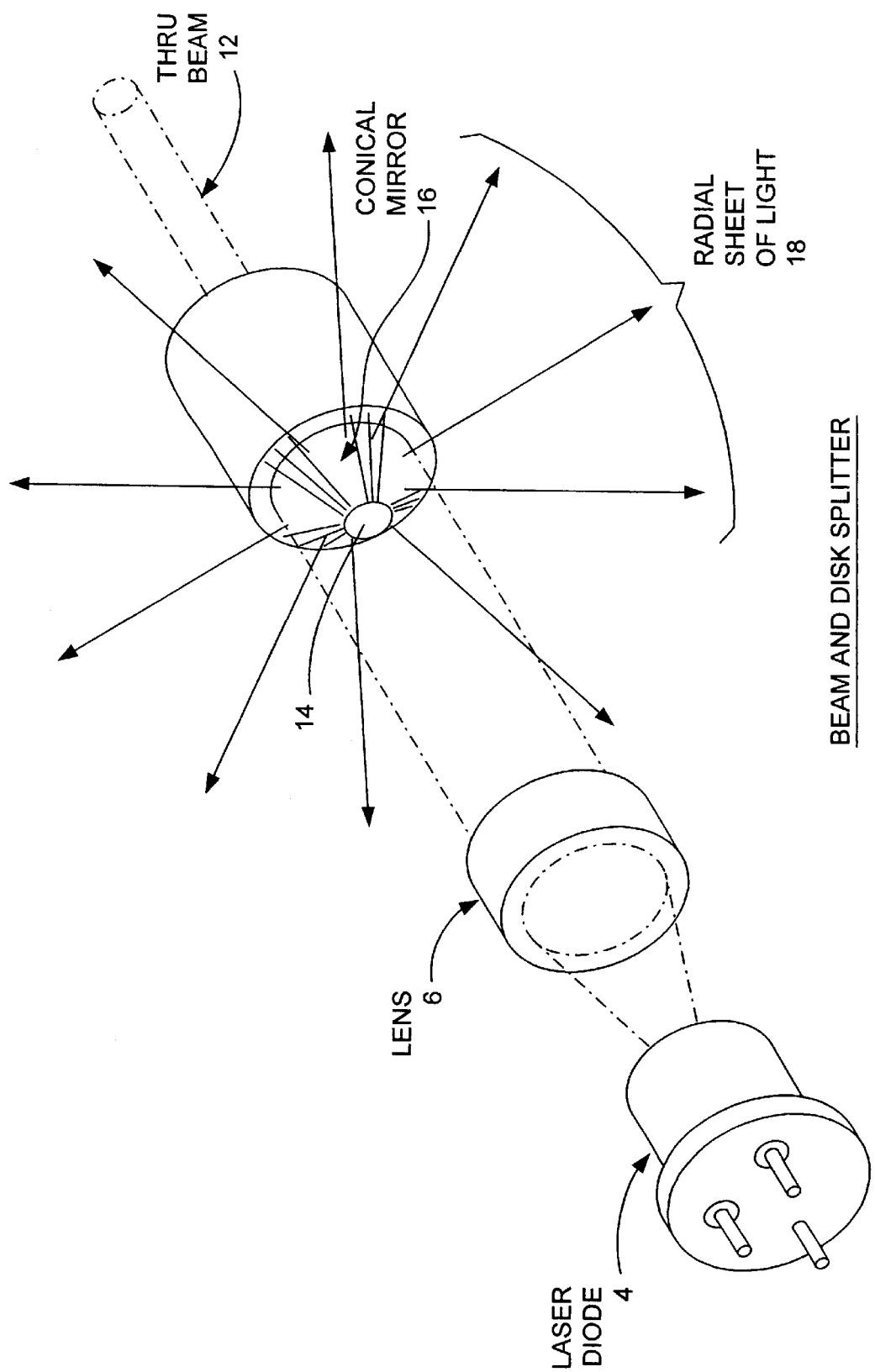
FIG. 2 is a perspective view of another embodiment of a beam splitter of the invention.

A related feature can be achieved by using a conical surface 16 and hole 14 as depicted in the embodiment of FIG. 2. This produces a plane or disk of laser light 18, together with an orthogonal laser spot.

Various embodiments of the invention may include a multiple faceted reflective device or devices having a mix of cylindrical and faceted areas. For example, a device having twenty-four facets would yield 24 beams or spots, each separated from its nearest neighbor by an angle of 15 degrees. Larger areas could be used for four of the facets, which would make those four reflected beams brighter relative to the others. This is useful in marking the major axes.

III. Cross Hair Projection

Figure 3:
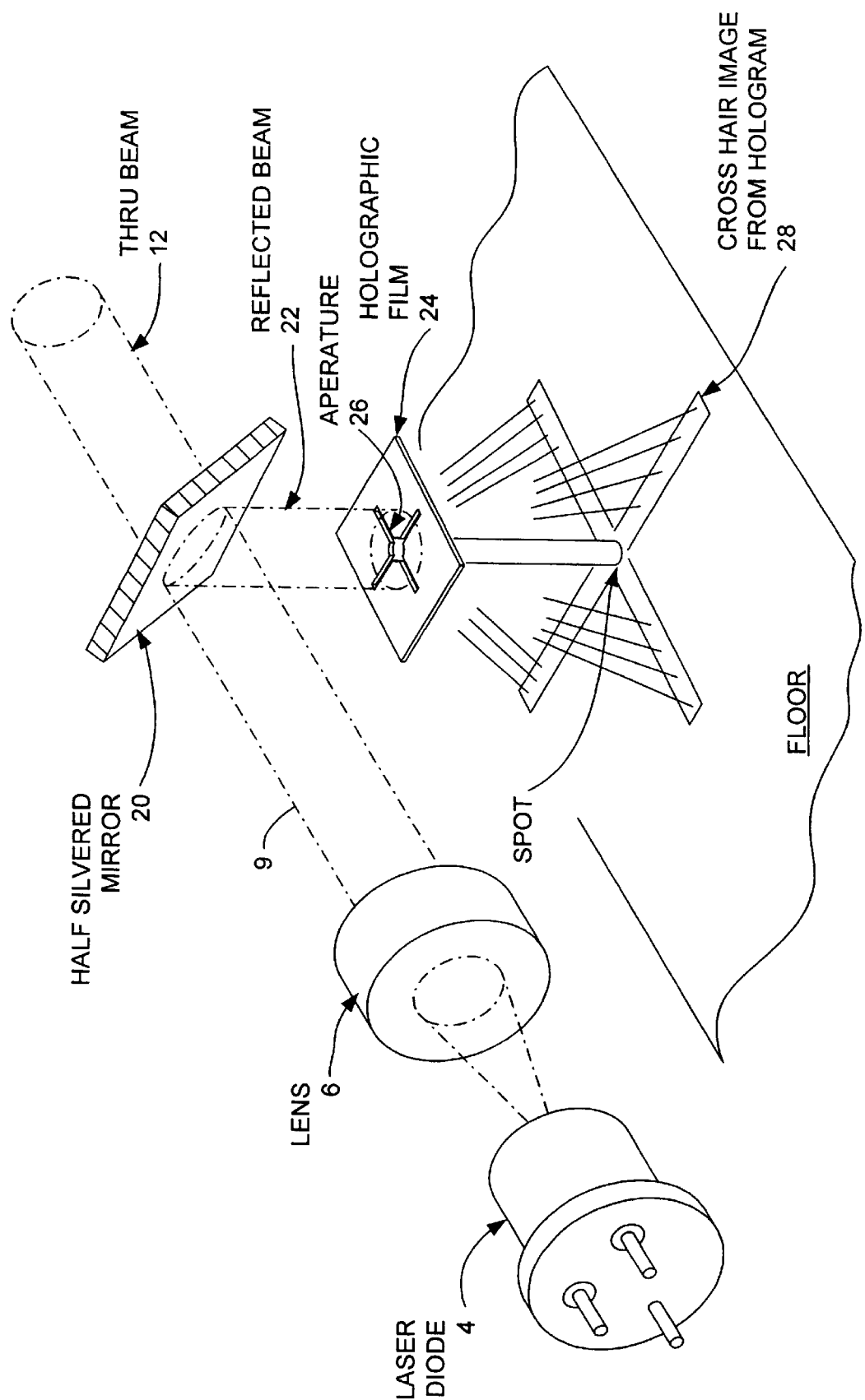
FIG. 3 is a further embodiment of the invention which can be used to project a pattern such as a pattern of cross hairs.

At short distances the beam may be too bright to use to easily center upon a reference line or point. In an embodiment of the invention as depicted in FIG. 3, a masking element such as a holographic film 24, positioned on one or more of the laterally reflected beams 22 (or beams 10a, b, c, d of FIG. 1) can be used to project a more useful short range image such as a cross hair 28, or a series of concentric circles. An aperture 26 in the mask allows some light to pass through to be used at a distance.

Alternatively, in other embodiments, a similar effect may be achieved by introducing intentional imperfections into the mirror surfaces.

FIG. 3 is simplified by using a half-silvered mirror as a beam splitter. Alternatively, the beam splitting FIG. 1 could be used.

IV. Side Beam Steering

The four side beams produced by the embodiment of a penta beam splitter of FIG. 1 are by design mutually perpendicular and coplanar, the accuracy of which being determined by the accuracy of the cutting process. But they may be thereafter aligned or adjusted to be precisely perpendicular to the central beam. A traditional approach would employ 4 set screws to precisely deflect the mirror block.

Figure 4:
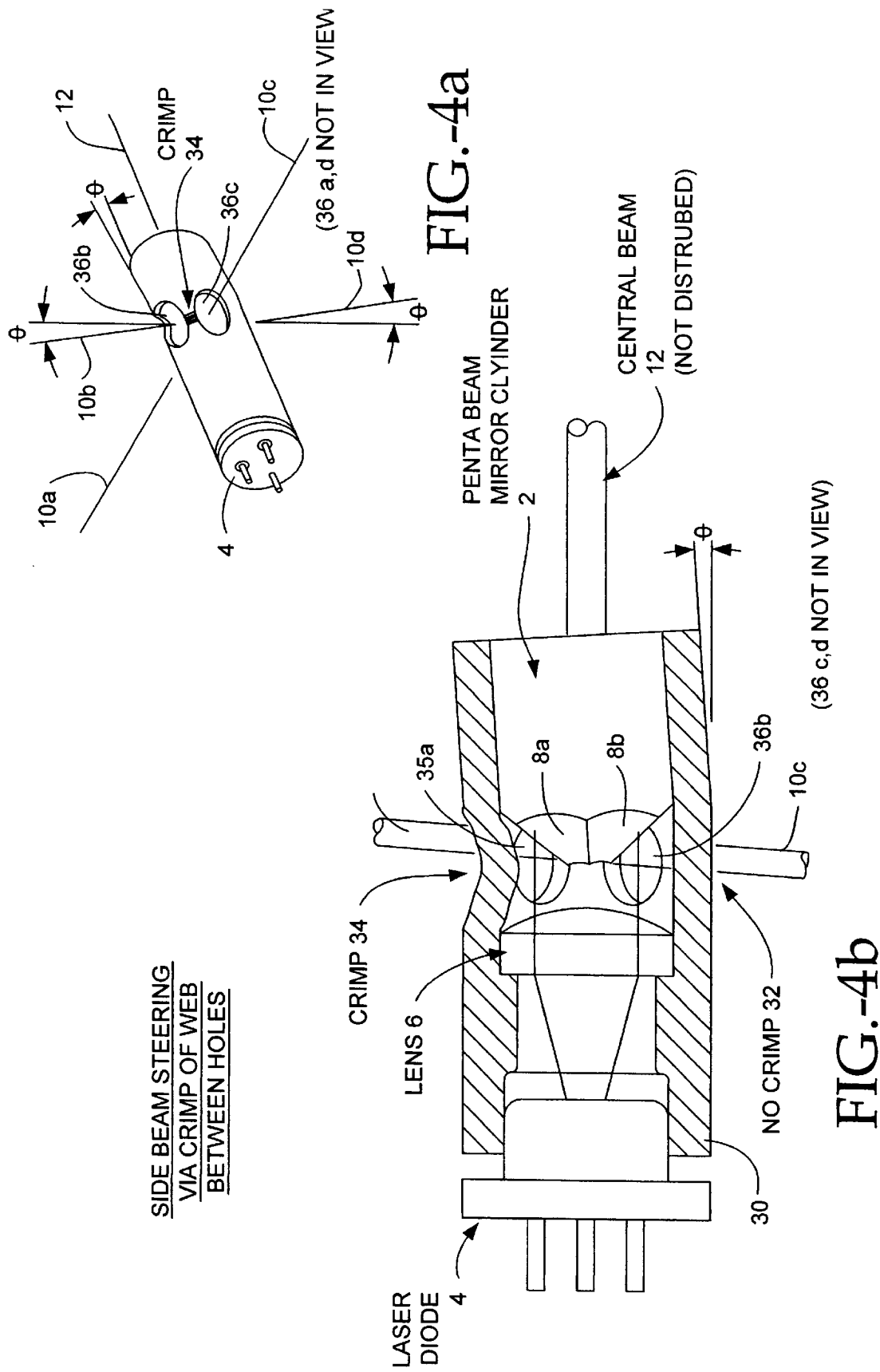
FIGS. 4a and 4b are perspective and side sectional views of yet another embodiment of the invention that allows for steering beams which are at angles with respect to the main laser source.

A present embodiment of the invention (FIGS. 4a, 4b) utilizes a novel approach to beam adjustment in mounting the laser assembly within a cylindrical enclosure 30 of deformable material, for example metal or plastic. The enclosure contains a series of beam exit holes 36a–36d around its circumference to allow the reflected beams exit the device. A web of deformable material remains between the holes. The method of beam steering as embodied in the invention works by crimping the web 34 formed between the side exit holes. Deforming an adjacent pair of webs slightly shortens the cylindrical structure in that local region. This causes the beam to rotate back about this location. Crimping and adjustments of the beam direction are noted by the angle θ in FIG. 4a.

This method of beam adjusting has the significant benefit of eliminating the need for glue, which aids in manufacturing and long term stability.

V. Beam Focus by Symmetric Crimping

Figure 5:
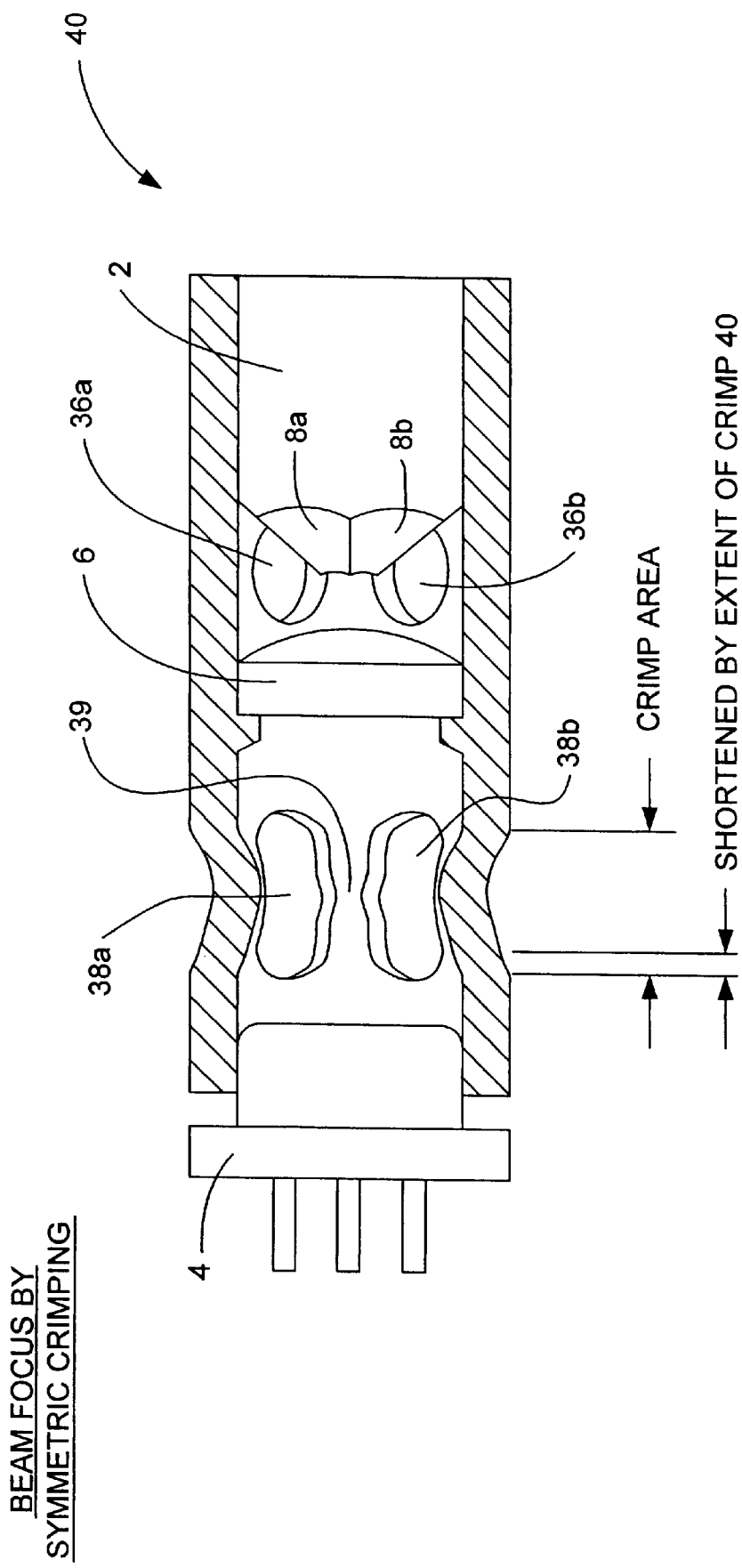
FIG. 5 is a side sectional view of yet another embodiment of the invention wherein the main laser beam can be focused by symmetrical crimping of the housing of the embodiment.

A technique similar to that of side beam steering described above may be employed to focus the laser diode, as shown in the embodiment of FIG. 5. In this embodiment another series of holes 38a–38d (holes 38c and 38d are not shown as they are in the cut-away half of the enclosure) are introduced into the cylindrical enclosure, this time between the laser source 4 and the lens 6. A web 39 of material remains between the holes. Bending all four webs the same amount causes the overall length of the section to shorten. In practice, the diode may be pressed into the cylinder at a distance just longer than nominal focal distance, and crimping applied to shorten the diode/lens separation by an amount 40 until the laser comes into focus. Typically, many metals have some rebound after bending. This factor can be predicted and compensated for by crimping past the focus point.

VI. Bearing Mount

A traditional means of producing a quality gimbal is with two pairs of roller bearings. The pairs must be precisely located and a preload must be applied to take out the clearance between the bearings and races. An embodiment of the present invention (FIGS. 6a, 6b) reduces this to a single pair of bearings 47, 48 suspended in a chain-like configuration. The slight angle θ shown on the transverse beam 46 allows the weight of the pendulum 49, on which the laser enclosure 30 is mounted, to be distributed over both bearing units.

Figure 6:
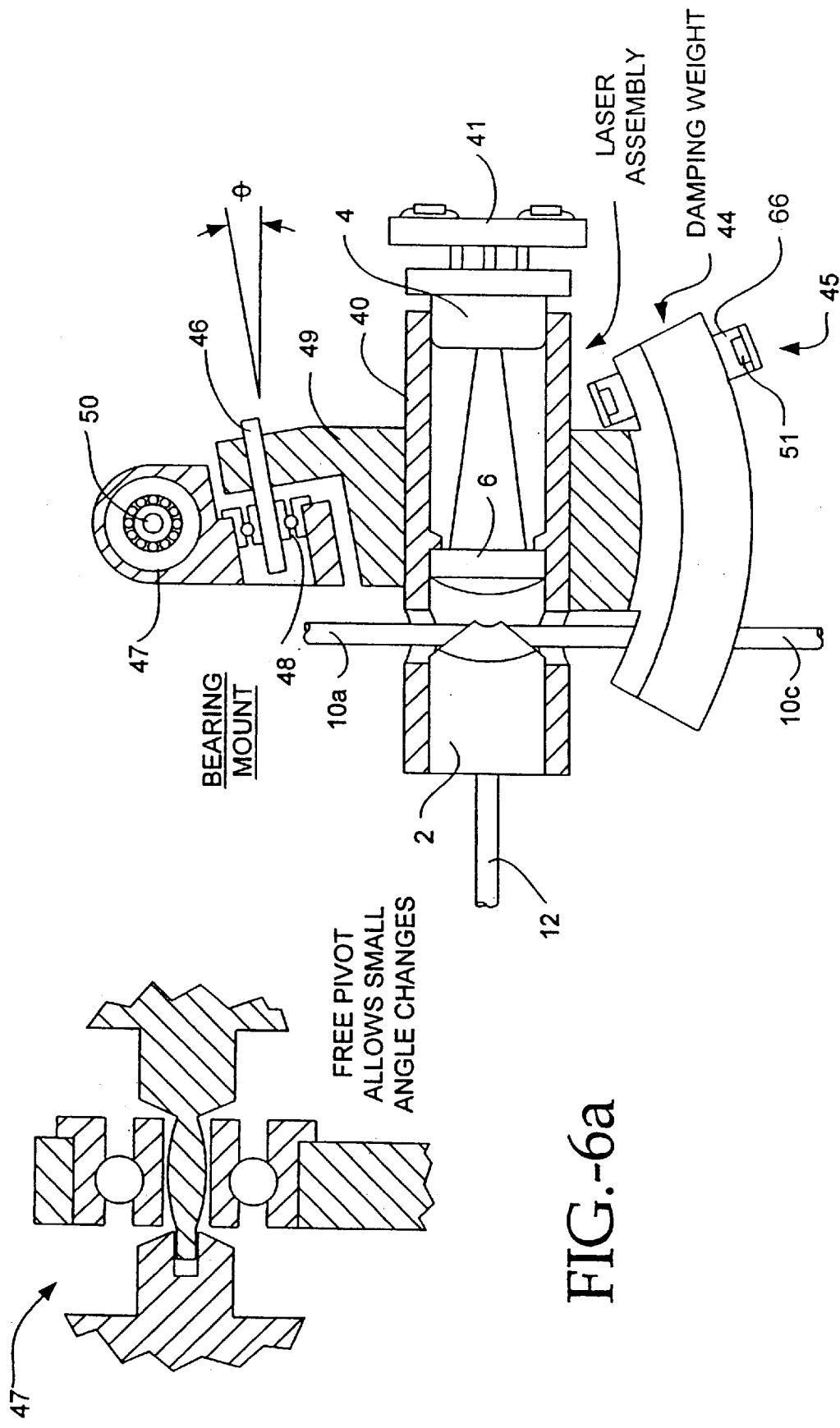
FIGS. 6a and 6b depict side sectional views of another embodiment of the invention, showing how the laser assembly is suspended by a bearing mount.

The pendulum arrangement shown in FIGS. 6a and 6b is hung from the double bearings 47, 48, and includes pendulum 49. Pendulum 49 mounts the laser enclosure 40 which can include the laser enclosure depicted in FIGS. 1 and 2 by way of example. The enclosure of FIG. 1 with the quad-mirror is preferable. Still preferable, as is described more fully hereinbelow would be the quad-mirror shown in FIG. 9 or 11.

FIG. 6a is a cross-sectional view of the upper bearing 47 shown in FIG. 6b. The lower bearing 48 is mounted on a pin 46 which extends at an angle from the pendulum body 49. It is in this way that the lower bearings 48 hangs down from the upper bearings 47, and the pendulum 49 hands down from the lower bearings 48. At the base of the pendulum is the damping weight 44. The damping weight 44 is generally comprised of a conductor and in particular, a copper conductor. In order for dampening to occur, a magnet arrangement 45 is depicted. In a preferred embodiment, the magnet arrangement includes a soft iron horseshoe-shaped mount 46 which extends around the back side of the damping weight 44. Two magnets, such as magnet 51, are mounted at the ends of the horseshoe 46. The horseshoe provides a return path for the magnetic flux in order to assist and concentrating the magnetic field between the front faces of the magnets 51 in order to more efficiently damp the damping weight 44. It is to be understood that in a preferred embodiment, a magnetic arrangement of 45 would be placed on each side of the damping weight. The damping weight would swing through the arrangements and be damped by both magnetic arrangements 45.

VII. Round Mirrors 54

Figure 7:
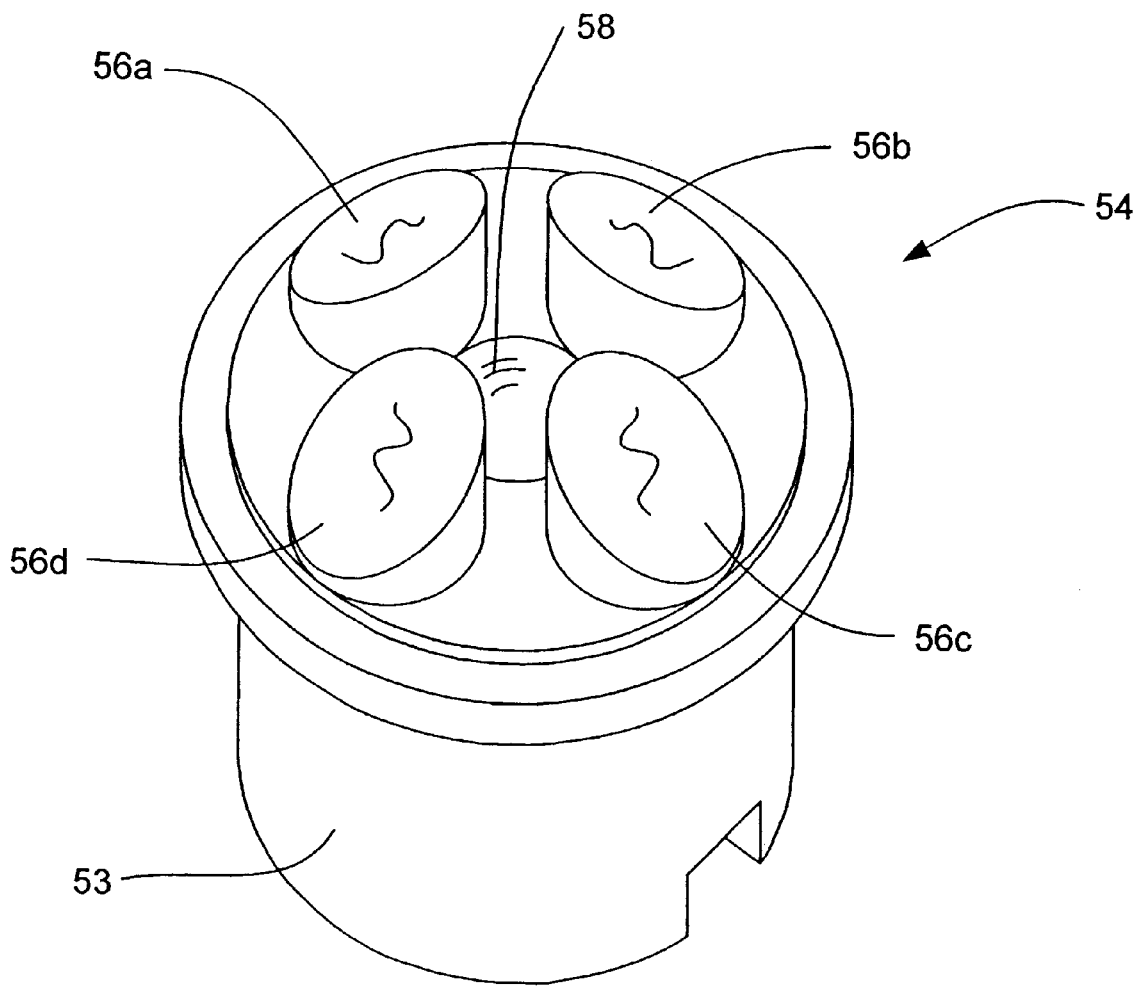
FIG. 7 is a perspective view of another embodiment of the invention using elliptical reflective mirrors.

The shape of the laser spot is of considerable interest. The practical need is to be able to identify and mark the center of the spot. In a squaring or plumb application this needs to be done in two axes. To facilitate this, a natural choice is round spots. The following describes a novel method of producing them. It involves die casting the quad mirror, previously described, in aluminum. A feature of the device is four small posts 56a–56d surrounding a central hole 58 (FIG. 7). The end of each post is single point diamond turned to produce four elliptical mirrors. The axial projection of each mirror is a circle. Thus, they act as apertures to project circular shafts of light in each of 4 directions.

Round Spots Resulting From Round Mirrors

Figure 8:
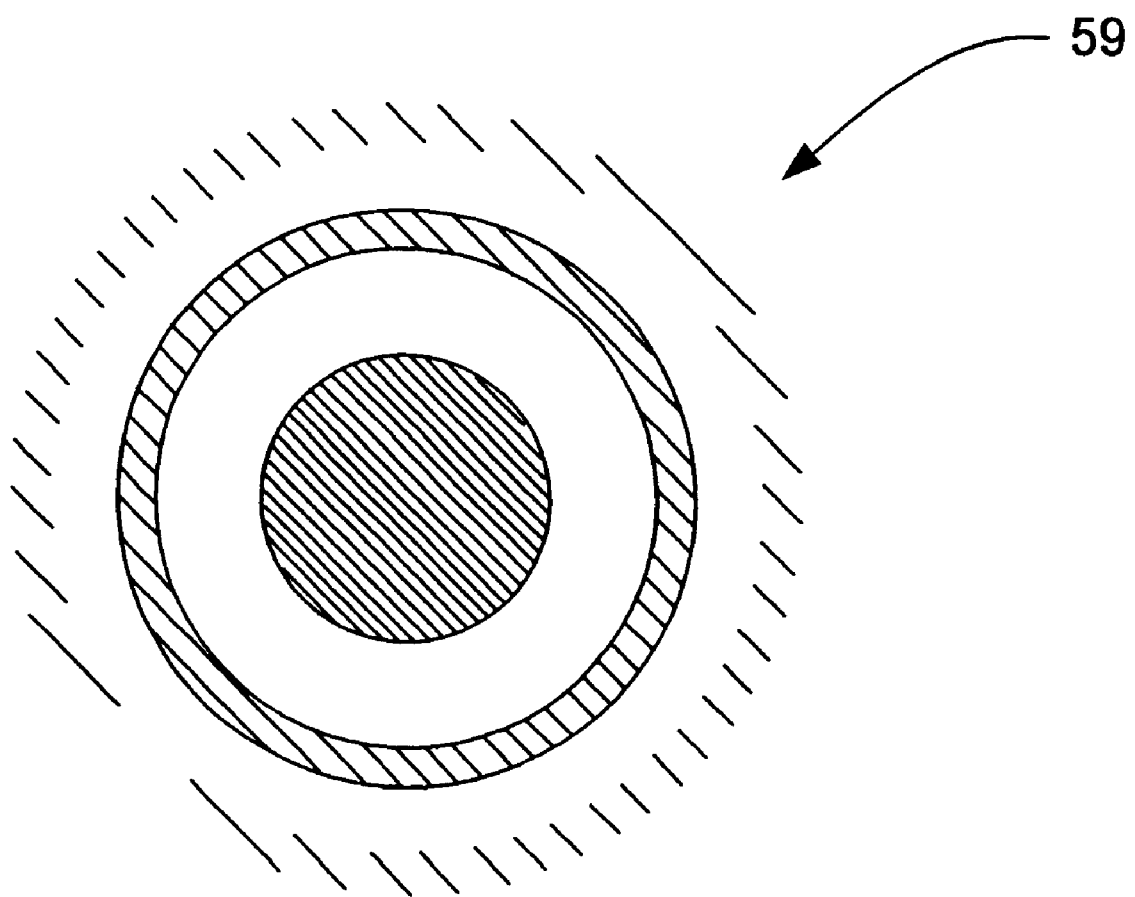
FIG. 8 depicts an interference target resulting from the use of device of FIG. 7.

The smaller the circular apertures 56a–56d, the larger the laser spots appear at a distance. This is due to the normal dispersion of light off of a sharp aperture. Since the laser light is monochromatic, the wave front from one side of the aperture interferes with the wave front from the other side. This results in a series of circular interference rings 59 (FIG. 8). The exact size and diameter of the central spot 60 from hole 58 and these rings 59 depends on the wavelength, distance to the target, and the aperture diameter. Apertures in the range of 2 mm produce acceptable spots.

VIII. Square Mirrors 60

Figure 9:
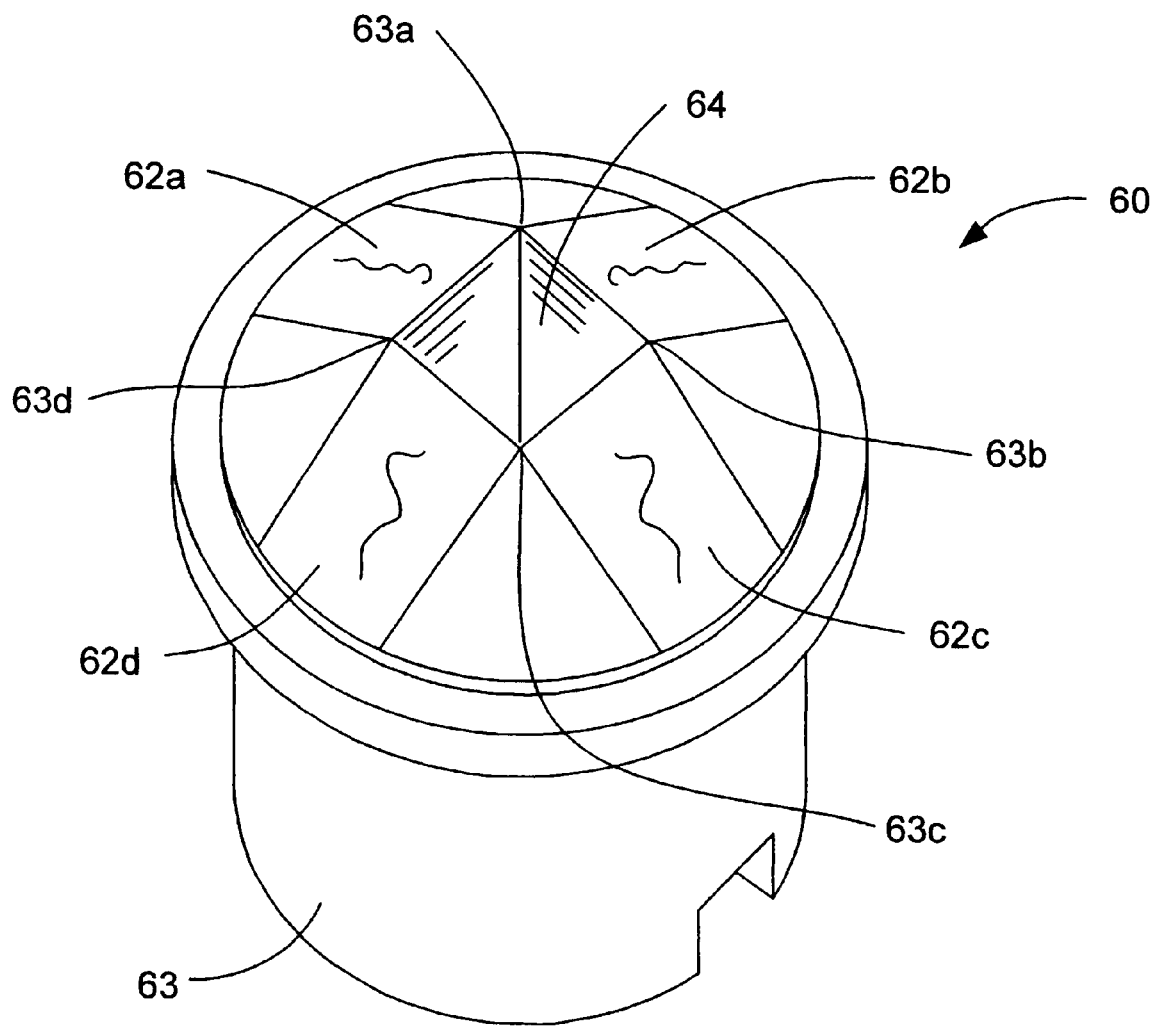
FIG. 9 is a perspective view of another embodiment of the invention using square reflective mirrors.

A novel alternative to the pyramidal mirror geometry proposed in the above is to form four small mirrors into a quad-mirror arrangement 60 with parallel sides (FIG. 9). This is readily accomplished by forming the blank on a screw machine with a special profile for the end cone. A square aperture 64 is readily broached through the center.

Four passes of a diamond-point fly-cutter then cuts four mirrors 62a–62b leaving the conical section in-between. In use, this presents five similar apertures to the incident laser beam.

As can be seen in FIG. 9, the four mirrors meet each other at common corners which define the central square aperture 64. Corner 63a, b, c, and c, at the sides of the four mirrors 62a–62d, do not go through the apex of the structure. In effect, the structure is truncated in order to form the square aperture 64. The truncated structure forms the square aperture 64 from which the four mirrors 62a–62d emanate. Due to this structure, this arrangement provides appropriate interference pattern so that targets can be formed as described below.

Square Spots

Figure 10A:
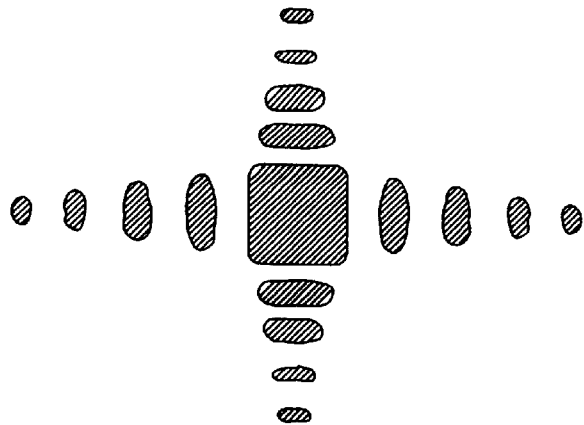
FIGS. 10a and 10b depict interference targets resulting from use of the device of FIG. 9.
Figure 10B:
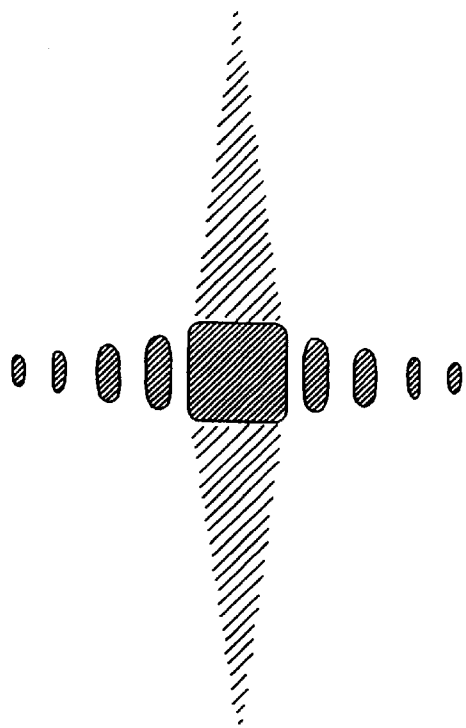

The square central aperture produces a nominally square spot (FIGS. 10a, 10b). As with the circular aperture, wave fronts from opposite sides interfere, but in this case a series of spots are formed radiating in four directions (FIG. 10a). This creates a "cross hair" formation that is ideal for marking. The apertures formed by the mirrors perform in a similar way. In the direction where parallel edges are presented, interference spots are formed. In the other direction, there in only one sharp edge (FIG. 10b). The dispersion from this edge produces a "smear" along this axis. It is similar in brightness and size to the string of spots in the other direction. Thus a cross-hair appearance is produced.

IX. Rectangular Mirrors 68

Figure 11:
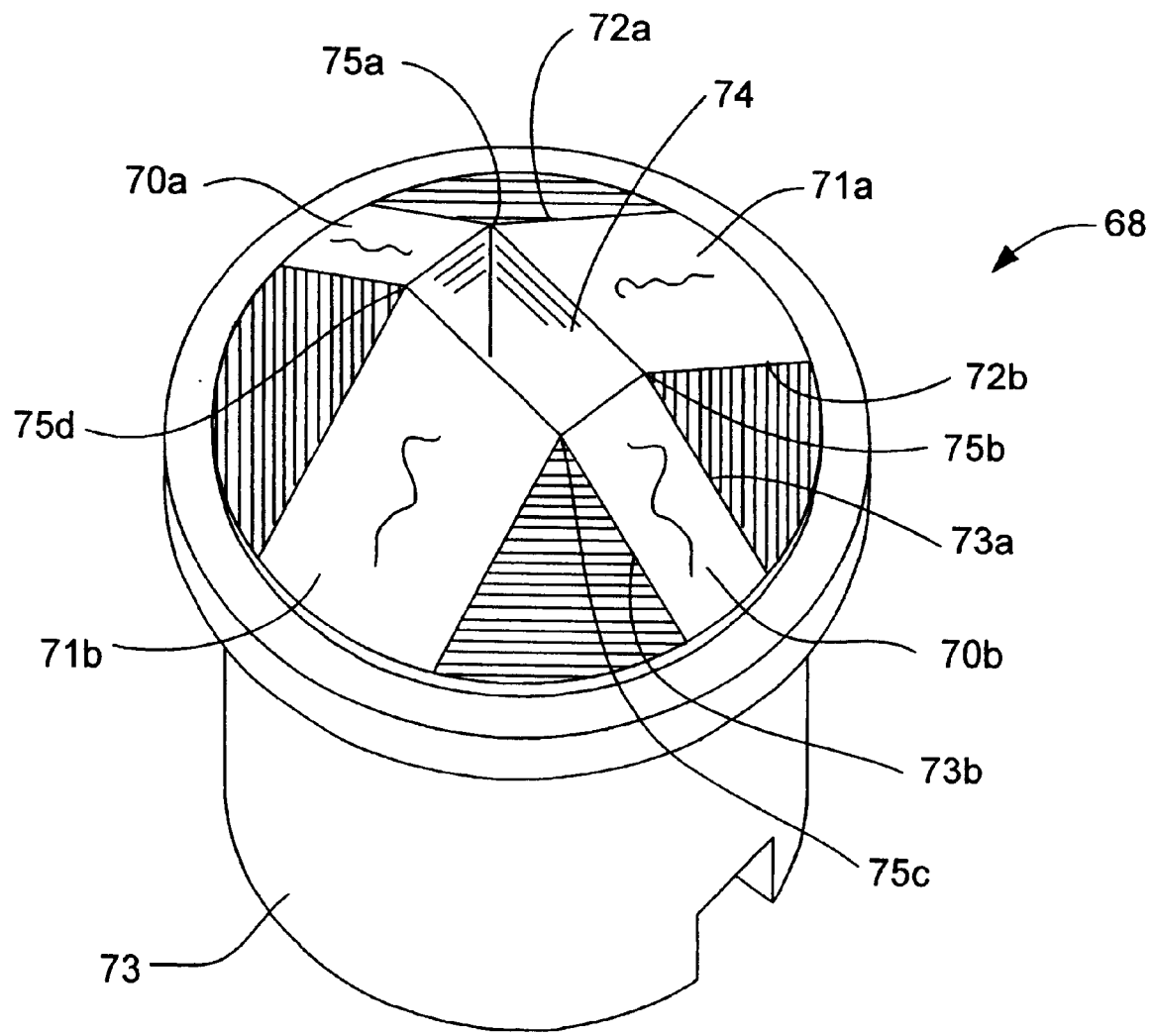
FIG. 11 is a perspective view of another embodiment of the invention using rectangular mirrors.

The light from a laser diode is presented from a typical collimating lens as a short line segment, in which the light is spread out more along one cross-sectional axis than the other. In one embodiment, to better slice up this beam, the mirrors 70a–70b and 71a–71b need be all the same (FIG. 11). Of further design consideration is the power distribution desired. For example, the up and down beams may not be desired to be as strong as the side beams, so the up and down reflectors may be designed to be smaller than the lateral or sideways reflectors. A wide range of power distributions is possible with minimal loss in the inter-mirror space.

With respect to FIG. 11, the configuration of the quad-mirror 68 includes the following. The rectangular aperture 74 has four corners 75a–75d. It is from these four corners that the mirrors 70a, b, and 71a, b, extend. Thus, as previously indicated, the corners of the mirrors do not all originate from the same apex. Viewing mirror 71a, it is evident that it is defined by substantially parallel side 72a, b, which originate respectfully from corner 75a, 75b. Similarly, the substantially parallel sides 73a, 73b of the mirror 70b originate from corners 75b, 75c, respectively. This same pattern occurs for the other mirrors 70a and 71b. In such an arrangement, the cross-hair patterns are created on the desired target. Also, as the sizes of the mirrors can be made to have different areas, the intensity of the beam can be made to vary.

Rectangular Spots

Figures 12A, 12B, 12C:
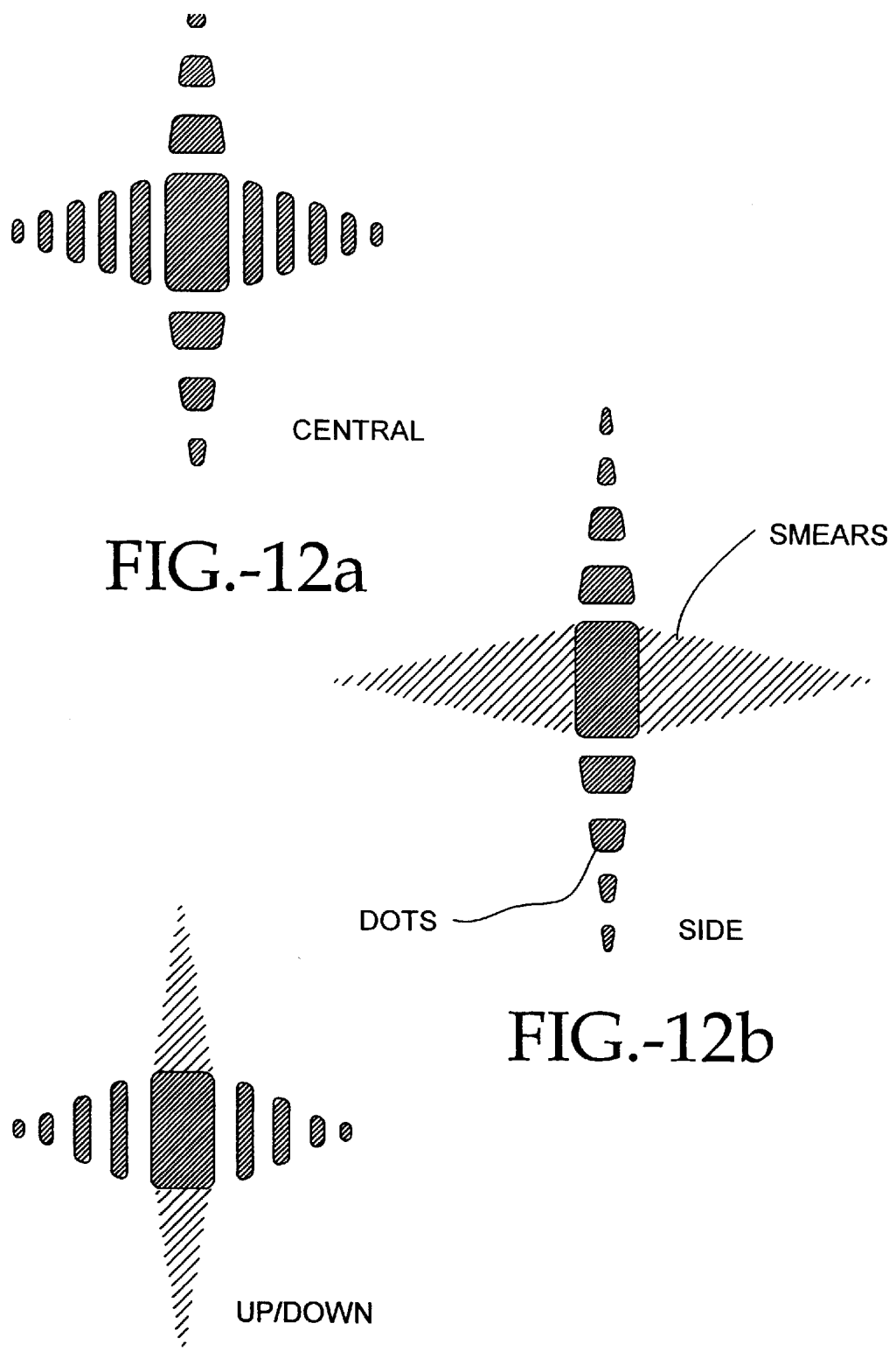
FIGS. 12a, 12b, 12c depict interference targets resulting from use of the device of FIG. 11.

The spots (FIGS. 12a, 12b, 12c) produced by rectangular mirrors are approximately rectangular. The direction of interference spots and smears are similar to those described above with respect to square mirrors. The spacing of the spots depends on the width of the aperture in each direction, so the spacing of the spots may not be the same for each direction.

X. Spring Compensation

Figure 13:
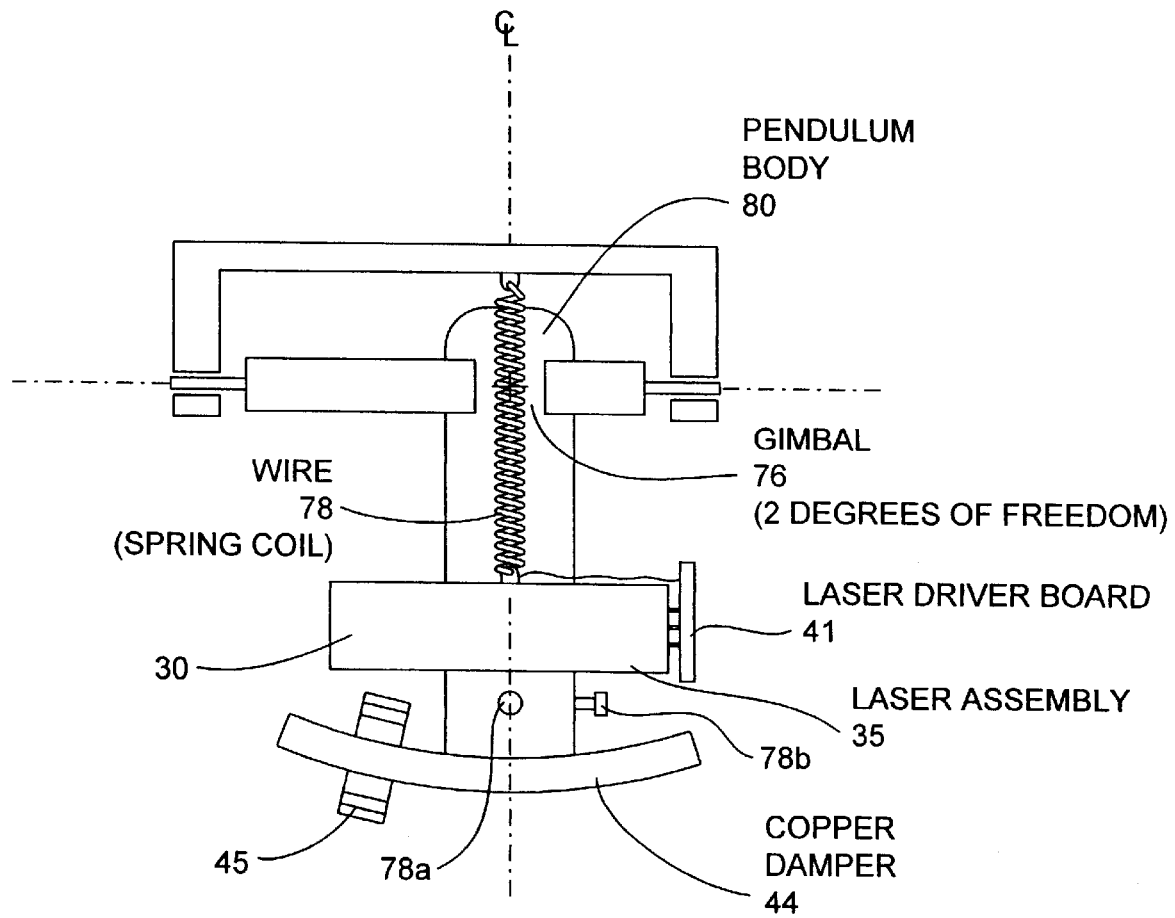
FIG. 13 is a side view of a pendulum laser mount with spring compensation.

The embodiment of FIG. 13 includes a pendulum 80 which hangs down from a gimble mount 76. The gimble mount allows the pendulum to swing in two directions of freedom. Hanging down from the gimble mounts is the coil wire 78 which is used to power the laser assembly 35. The laser assembly includes the driver board 41 to which the wire is attached. Hanging down from the pendulum is the damper 44. The damper 44 is damped by the damping arrangement 45 as previously described.

The laser Diode Optical assembly in enclosure 40 requires two electrical connections. This is typically achieved by the use of very fine copper wires. But such wires present a surprisingly significant spring torque on the pendulum. The nozero stiffness has the property of dipping the beam if the housing is rotated forward. This is one of the dominant limiting factors in miniaturizing a pendulum assembly. Making the pendulum longer, the service loop longer, and/or coiling the wires are techniques widely used in existing system.

An embodiment of the invention has the wires formed into a coil 78 and used as an extension spring. Stretched across the axis of rotation of the pendulum 80 it functions as an "over center mechanism". This has the inverse property that the beam pos up if the housing is tilted forward.

By carefully matching the bending stiffness against the over center spring the two effects are largely canceled. Although FIG. 13 shows a sectional view through one dimension, this effect works simultaneously in all degrees of freedom of the pendulum.

A further benefit of this method is that the over center spring acts to relieve gravitational drag torque on the bearings. This may make it possible to use still shorter pendulums and rollerless bearings.

XI. Field Calibration by Sprint Compensation

A feature of the invention is field calibration. This is typically accomplished by adjusting screws 78a, b, mounted in the pendulum. In the field, should the laser beams come out of alignment, the alignment can be corrected by adjusting the distribution of weight on the pendulum. This is accomplished by adjusting the position of the adjusting screws 78a, b, causing the screws to move into or out of the pendulum.

Initial alignment during manufacturing can be accomplished by removing weight from the damper 44 by for example a drilling technique in order to align the laser beams with preestablished targets.

Figure 14:
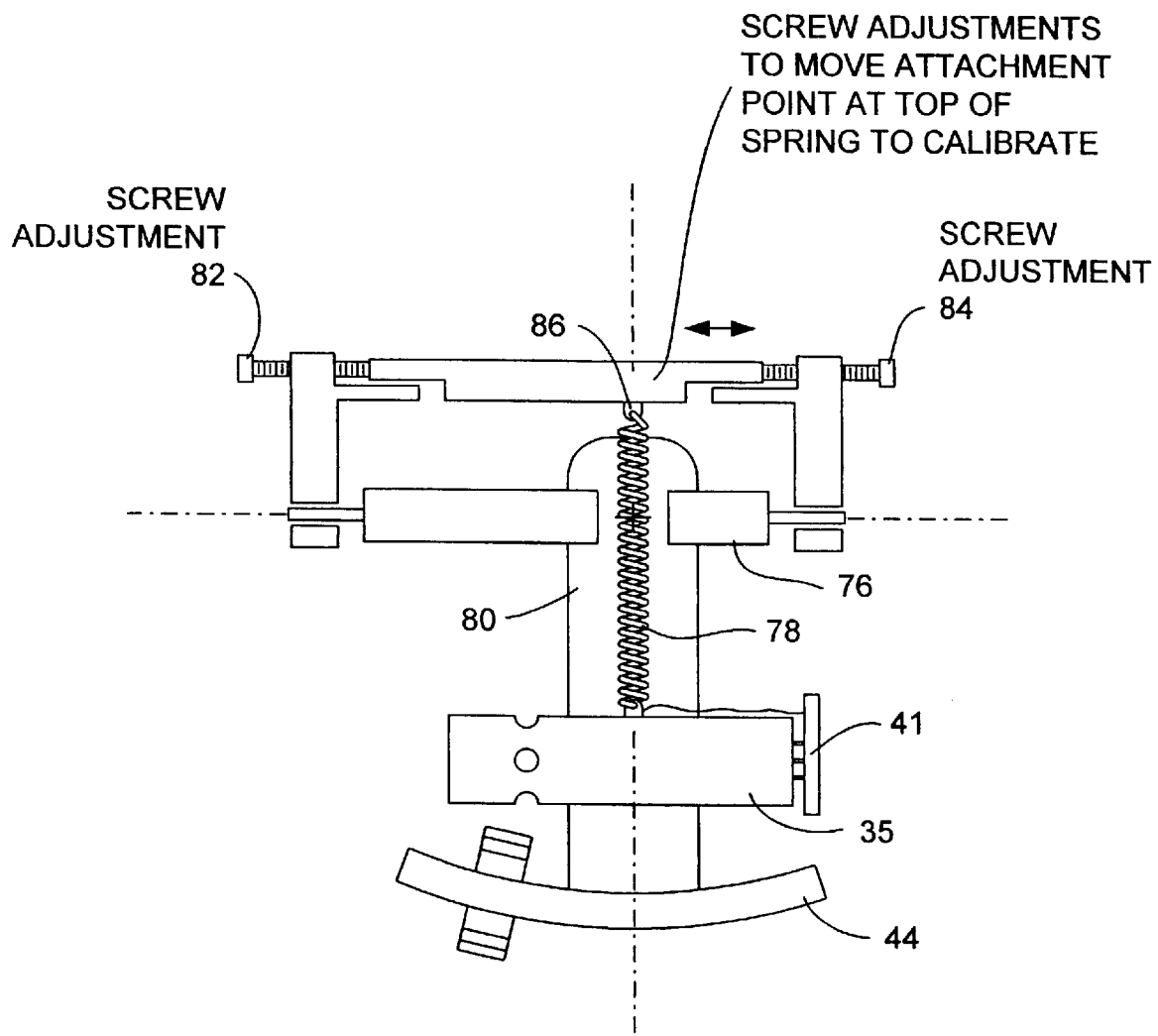
FIG. 14 is a side view similar to FIG. 13 which allows for field calibrations.

With respect to another type of field alignment, the axial positioning of the over center spring is important. If off-axis it would leave a net torque on the pendulum. A novel feature of invention allows for such a misalignment to be used to field calibrate the pendulum. As shown in FIG. 14, screw pairs 82, 84 can manipulate the spring mounting points 86, therein adjusting the orientation of the suspended laser assembly. This has the desirable property that the user need not come into contact with the delicate pendulum assembly.

Industrial Applicability

The present invention provides for multiple embodiments which can generate multiple laser beams for measuring, aligning, leveling and other purposes. In addition, the embodiment are for beam steering and focusing as well as mounting of the laser itself.

What is claimed is:

1. A method for adjusting at least one reflected beam emitted from an enclosure, the method comprising:

emitting a beam of radiation along a path into the enclosure;

placing a reflective element in the path of the radiation to produce the at least one reflected beam; and deforming the enclosure to adjust the position of the reflective element relative to the path of radiation.

2. The method of claim 1 wherein deforming the enclosure comprises crimping the enclosure asymmetrically to move the reflective element for steering the at least one reflected beam.

3. The method of claim 1 wherein deforming the enclosure comprises crimping the enclosure symmetrically to move the reflective element for focusing the at least one reflected beam.

4. The method of claim 1 wherein deforming the enclosure comprises overcrimping the enclosure to compensate for material rebound.

5. The method of claim 1 further comprising:

providing at least one exit hole through the enclosure to allow the at least one reflected beam to exit the enclosure.

6. The method of claim 5 wherein deforming the enclosure comprises crimping the enclosure in the region of the at least one exit hole.

7. The method of claim 5 further comprising:

weakening the enclosure in the region of the at least one exit hole to assist in deformation of the enclosure.

8. The method of claim 1 further comprising:

providing a holographic film in the path of the at least one reflected beam to modify the shape of the at least one reflected beam.

9. The method of claim 1 further comprising:

providing a laser source for emitting the beam of radiation into the enclosure; and providing a lens in the path of the radiation to produce a collimated beam, the lens disposed a distance apart from the laser source, the collimated beam being incident on the reflective element.

10. The method of claim 9 wherein the reflective element includes an aperture to allow part of the collimated beam to pass without reflection.

11. The method of claim 9 wherein deforming the enclosure comprises crimping the enclosure between the laser source and the lens so that the distance between the laser source and the lens is shortened.

12. An optical tool comprising:

an enclosure of deformable material;

a unitary body at least partially disposed within the enclosure, the unitary body forming an axially directed aperture extending there-through, a plurality of reflective facets having a first reflectivity outward of the aperture and other sections having a second reflectivity in-between the facets, each facet being obliquely oriented relative to the axial direction;

a light source providing a beam of light for illuminating the reflective facets;

a collimator disposed within the enclosure a distance from the light source to intercept and collimate at least a portion of the beam of light.

13. The optical tool of claim 12 wherein the enclosure further comprises a plurality of holes around the circumference of the enclosure, the plurality of holes being disposed between the light source and the collimator.

14. The optical tool of claim 12 wherein the enclosure is symmetrically deformed between the light source and the collimator, wherein the beam of light is focused upon the unitary body.

15. The optical tool of claim 12 wherein the enclosure is asymmetrically deformed, wherein the asymmetrical deformation positions the unitary body relative to the beam of light for steering at least one beam reflected from the unitary body.

16. The optical tool of claim 12 wherein at least one of the plurality of reflective facets is elliptical.

17. The optical tool of claim 12 wherein a first one of the plurality of reflective facets is larger than a second one of the plurality of reflective facets.

18. The optical tool of claim 12 wherein the unitary body forms four reflective facets having the first reflectivity and four other non-planar sections having the second reflectivity in-between the four reflective facets, wherein the four facets are disposed at 45° relative to the axial direction and are substantially evenly disposed at 90° intervals around an edge of the aperture.

19. The optical tool of claim 12 further comprising:

a pendulum coupled to the enclosure; and a gimbal mount for suspending the pendulum and allowing substantially pendular motion relative to an axis of rotation.

20. The optical tool of claim 19 further comprising a conductive spring coupled to the light source, the conductive spring symmetrically disposed about the pendulum.

* * * * *

UNITED STATES PATENT AND TRADEMARK OFFICE
CERTIFICATE OF CORRECTION

PATENT NO.    : 6,657,788 B2
DATED         : December 2, 2003
INVENTOR(S)   : Christopher A. Tacklind et al.

It is certified that error appears in the above-identified patent and that said Letters Patent is hereby corrected as shown below:

<u>Title page,</u>
Item [75], after "Andrew G. Butler", replace "Alto" with -- Palo Alto --.

Signed and Sealed this

Fifteenth Day of June, 2004

JON W. DUDAS
*Acting Director of the United States Patent and Trademark Office*